C. G. MURIDGE.
MOTOR CYCLE.
APPLICATION FILED JUNE 10, 1911.

1,062,844.

Patented May 27, 1913.
2 SHEETS—SHEET 1.

Witnesses

Inventor
C. G. Muridge
By Perry S. Webster
Attorney

C. G. MURIDGE.
MOTOR CYCLE.
APPLICATION FILED JUNE 10, 1911.
1,062,844.
Patented May 27, 1913.
2 SHEETS—SHEET 2.
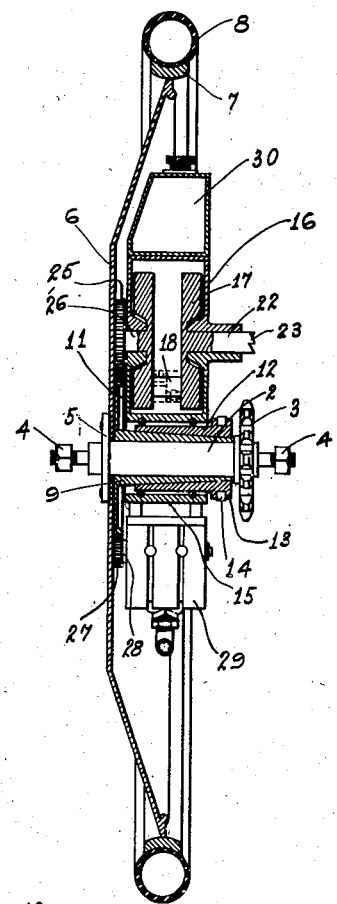
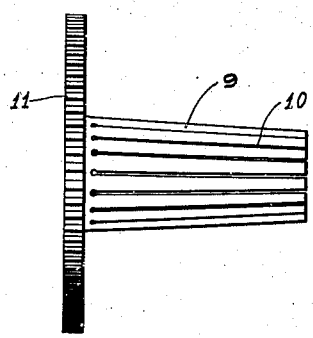
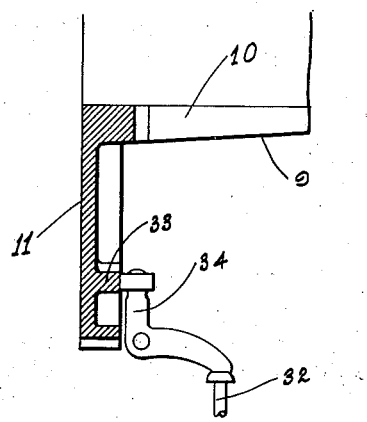
Witnesses
Inventor
C. G. Muridge
By Perry S. Webster
Attorney

UNITED STATES PATENT OFFICE.

COURTENAY G. MURIDGE, OF ELK GROVE, CALIFORNIA.

MOTOR-CYCLE.

1,062,844.

Specification of Letters Patent.

Patented May 27, 1913.

Application filed June 10, 1911. Serial No. 632,522.

*To all whom it may concern:*

Be it known that I, COURTENAY G. MU-RIDGE, a citizen of the United States, residing at Elk Grove, in the county of Sacramento, State of California, have invented certain new and useful Improvements in Motor-Cycles; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in motor cycles and is particularly designed as an improvement upon the ordinary type of bicycle whereby by inserting my improved structure into the rear frame of the bicycle instead of the ordinary rear wheel of the same, such bicycle may be easily and inexpensively converted into a motor cycle.

A further object of the invention is to produce a motor disposed within the body of a wheel whereby when said wheel is mounted into the frame of the bicycle the operation of the motor will drive said wheel, there also being embodied within the body of the wheel a fuel supply tank, a magneto and in fact anything necessary to the complete operation of the motor.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings similar characters of reference indicate corresponding parts in the several views.

Figure 1:
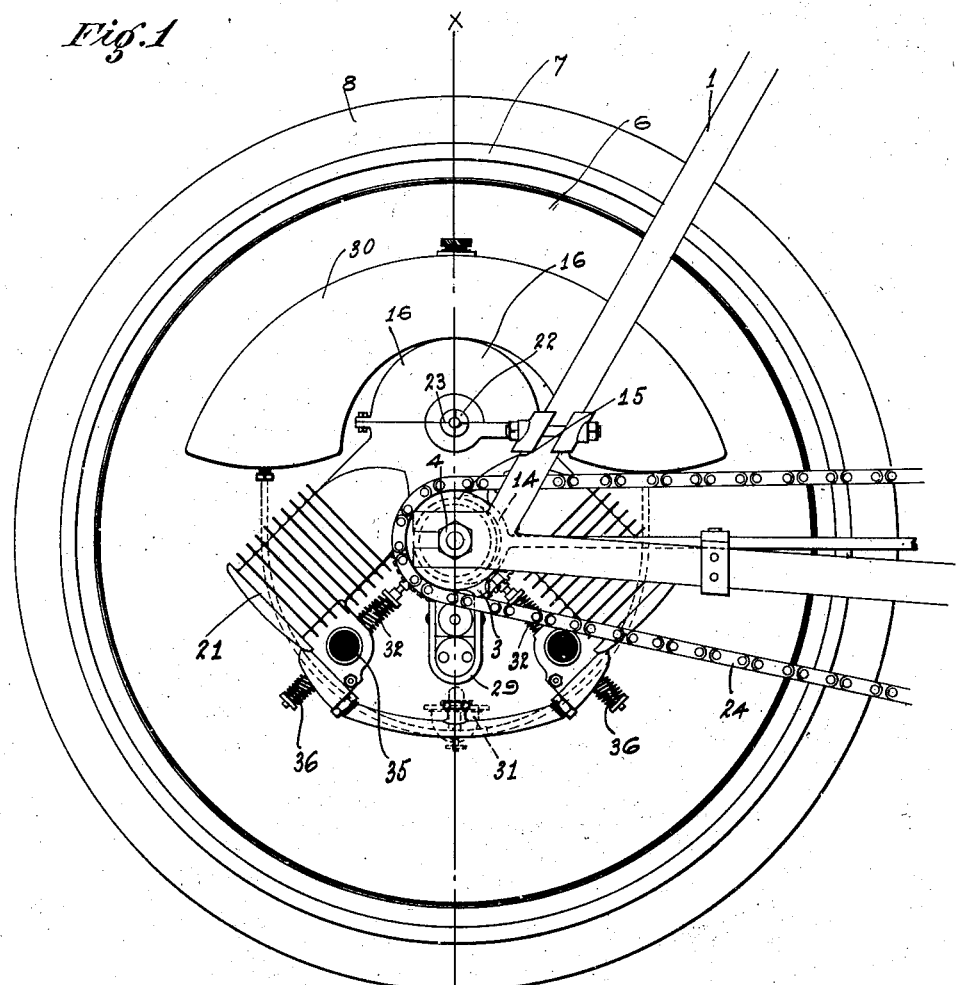
Figure 2:
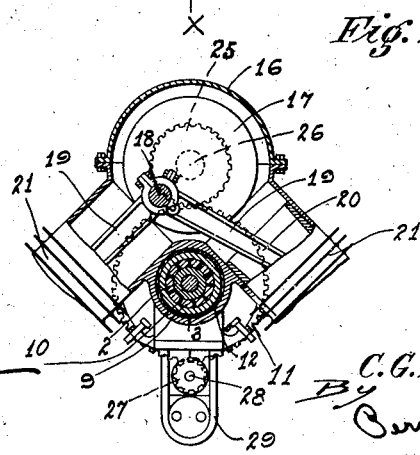

Figure 1 is a side elevation of my improved wheel. Fig. 2 is a fragmentary view of the motor partly in section. Fig. 3 is a sectional view taken on a line X—X of Fig. 1. Fig. 4 is a side elevation of a clutch member. Fig. 5 is a fragmentary view showing a valve operating mechanism.

Referring now more particularly to the characters of reference on the drawings, the numeral 1 designates the frame of the bicycle and the numeral 2 is the ordinary hub having the sprocket wheel 3 and nuts 4 to secure the same on the hub, the hub 2 being of the regular coaster type whereby when the pedals of the wheel and incidentally the sprocket 3 are held stationary, the hub 2 can still revolve independently thereof. On the hub 2 is a projecting flange 5 riveted to which is a corrugated steel concaved disk 6 riveted on its outer edge to the rim 7 of the wheel 8.

The numeral 9 designates a cone provided with a plurality of slits 10 along its length, such cone fitting over the hub 2 and being provided on one end with a pinion 11.

The numeral 12 designates a clutch sleeve mounted over the cone 9 and being tapered on its inner edge to conform to said cone 9 and being horizontally straight on its outer circumference. The outer end of said clutch sleeve 12 is provided with a clutch collar 13 adapted to receive a clutch yoke 14 to move the clutch sleeve 12 in and out to cause the cone 9 to have a frictional contact with the bearing 2 so that when said cone 9 turns as will be hereinafter described it will drive said bearing and incidentally the motor cycle. Mounted upon ball bearings interposed between it and the sleeve 12 is a sleeve or box 15 provided with a casing 16 in which are journaled fly wheels 17 having a cross pin 18 connected with which are piston rods 19 connected with pistons 20 operating in cylinders 21, which cylinders are cast as a component part of the box or sleeve 15.

One of the fly wheels 17 is provided with a starting shaft 22 which projects through the side of the casing 16 and is provided with a clutch 23 to receive the starting crank, hence the motor can be started by means of said shaft 22 or by engaging the clutch 9 on the bearing 2 in the manner set forth above and then operating the pedals of the motor cycle which will cause the chain 24 to drive the gear 3 and the bearing 2, the cone 9 and the gear 11, which gear 11 intermeshes with a gear 25 connected by a shaft 26 with the other fly wheel 17. Hence with the operation of the motor it will be seen that the fly wheels are driven and then through the medium of the gears 25 and 11 the cone 9 is driven and it being fixed in frictional contact with the bearing 2 by means of the sleeve 12, this drives the wheel of the motor cycle giving to the motor cycle its forward movement.

The numeral 27 designates a gear intermeshing with the gear 11 and mounted on a shaft 28 driving a magneto 29 connected in the usual manner with the cylinder 21 to provide the necessary spark to explode the mixture in the engine.

The numeral 30 designates the gas or fuel tank mounted on the wheel and connected with the engine through a carbureter 31 in the usual manner, such engine being provided with valves having operating stems 32 adapted to be opened and closed by means of cams 33 on the gear 11 which engage bell cranks 34 adapted to engage the stems 32 to open said valves at regular intervals necessary to the operation of the motor. The motor is also provided with suitable exhaust ports 35 provided with valves 36 to operate in the usual manner, no claim being laid to this particular structure hence no detailed description of the same is entered into. The magneto 29 as before stated is connected with the motor in the usual manner and is provided with the usual timing mechanism but as I lay no claim to these features no specific description of the same is given herein.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising a bearing, a wheel secured to said bearing, a split cone mounted on said bearing and provided with a gear, a clutch sleeve mounted on said split cone, a motor suspended on said clutch sleeve, and means connecting said motor with the gear on said cone, as described.

2. A device of the character described comprising a bearing, a wheel mounted on said bearing, a split cone mounted on said bearing and provided with a gear, means for securing said split cone to said bearing in frictional contact, a motor suspended on said wheel, and means connecting said motor with the gear on said cone, as described.

3. A device of the character described comprising a bearing, a wheel mounted on said bearing, a split cone mounted on said bearing, a gear on said cone, a clutch sleeve mounted on said split cone, a motor suspended on said clutch sleeve, fly wheels driven by said motor, a gear on said fly wheels, said gear engaging the gear on said cone, as described.

In testimony whereof I affix my signature in the presence of two witnesses.

COURTENAY G. MURIDGE.

Witnesses:
   Ulysses S. Smith,
   Paul H. Fahle.